United States Patent Office 2,807,554
Patented Sept. 24, 1957

2,807,554

COATING COMPOSITIONS CONTAINING A WAX AND A METHYL POLYSILOXANE

Roger Henri Bernard Serey, Paris, and Pierre Pascal Peyrot, Lyon, France, assignors to Societe des Usines Chimiques Rhone-Poulenc, Paris, France, a French body corporate No Drawing. Application August 2, 1954,
Serial No. 447,435

Claims priority, application France August 6, 1953

5 Claims. (Cl. 106—271)

This invention relates to compositions for use in the preservation and protection of surfaces of articles.

Products for preserving, protecting and polishing surfaces of metal, paint, wood or leather are composed mainly of waxes (natural or synthetic) or of wax mixtures, or again of products of a waxy consistency, such for example as paraffin wax, which are dispersed in an organic solvent or a mixture of compatible solvents.

It has already been proposed to incorporate organopolysiloxanes in wax compositions with the object of facilitating the spreading of the waxy products on the supports to be coated, of facilitating the production of gloss after drying of the mixture without any vigorous rubbing being necessary, and of providing the protective film deposited on the support with waterproof and non-staining properties by which the appearance thereof is improved.

However, the organopolysiloxanes are generally immiscible or substantially immiscible with the waxy compositions generally employed in the preparation of such products; in consequence they are exuded from the mass either before use or on the support, which is detrimental to the commercial presentation of the products and to the homogeneity of the deposited film.

Some organo-polysiloxanes are known which are particularly adapted to mix homogeneously with natural and synthetic waxes, but in order to obtain the desired effect it is necessary to incorporate considerable quantities of such organo polysiloxanes in the composition with the result that the cost of the product is excessively increased.

According to the present invention a protective and preservative coating composition comprises a substantially uniform admixture of a waxy composition, a methyl or methylphenyl polysiloxane oil or resin or mixture thereof, and a titanic acid ester. The said compositions, which will be referred to hereinafter, for brevity, as "protective compositions," are stable at room temperature and may be deposited as hard, glossy and waterproof films on the most varied supports.

By "waxy compositions" are meant compositions containing natural waxes such as beeswax, carnauba wax or candelilla wax, products such as paraffin wax, ozokerite, crystalline or micro-crystalline waxes, whether oxidised or not, or mixtures of such waxes, with or without additions of stabilisers, colouring agents or pigments. These compositions may be of solid, paste or liquid form depending upon whether they contain solvents or diluents in which the waxes are dissolved, dispersed or emulsified. In such compositions, the quantity of waxes or the like may vary within wide limits, for example from 0.5% to 100%, in accordance with the uses for which these compositions are intended. The practical application of the present invention is not limited to any particular type or chemical constitution of the said waxy compositions, which may be varied as required.

The organopolysiloxanes which may be employed in accordance with the present invention may be either organopolysiloxane oils, that is to say, those having an R:Si ratio between 1.9:1 and 2.1:1 (R being the number of methyl and/or phenyl groups attached to each silicon atom), or they may be organopolysiloxane resins and more particularly methyl or methylphenyl polysiloxane resins having an R:Si ratio preferably between 1.3:1 and 1.7:1. These organopolysiloxanes are prepared by the usual methods and it is to be noted that the practical application of the invention is not limited to the method of preparation either of the oil or of the resin.

The organopolysiloxane resins are generally employed in solution in an organic solvent or a mixture of compatible solvents. Moreover, an oil or a resin, or a mixture of oil and resin may be employed, depending upon the consistency and the properties which it is desired to impart to the final compositions.

The specific titanic acid ester to be employed in carrying the present invention into effect is preferably selected with regard to the degree of water resistance required in the product. Where the support to be protected is not normally exposed to water, moisture or aqueous mixtures, an alkyl titanate, of which butyl titanate is a typical example, is entirely satisfactory. Butyl titanate is the commercial product corresponding to the formula $Ti(OC_4H_9)_4$. Its theoretical titanium content is 14.1% but technical products containing butyl alcohol may be employed. Partially polymerised butyl titanate may also be employed in the viscous liquid state.

However, the alkyl titanates (for example butyl titanate), hydrolyse and precipitate rapidly in the presence of moisture, and accordingly films obtained from the compositions in which they have been incorporated tend to develop undesirable stains and white marks under moist conditions. In such cases, ethanolamine titanates and particularly triethanolamine and diethanolamine titanates will preferably be employed as the titanic acid esters. In cases where such aminated titanic acid esters are not soluble in the solvents employed, the dispersion thereof may usually be facilitated by adding an appropriate additional solvent.

The action of these various titanic acid esters on the quality and appearance of the films deposited on the most varied supports is clearly apparent from the examples which follow.

The proportions of the various constituents hereinbefore enumerated may vary within wide limits, but preferably the protective compounds contain from 1% to 40% of organopolysiloxanes (oil+resin) and from 0.5% to 20% of titanic acid esters, the percentages being calculated on the solid content of the waxy composition. Those quantities are however in no way limitative and depend primarily upon the desired effect and economic concentrations.

The incorporation of the various ingredients of the protective compositions according to the present invention is effected by any convenient method. It has been found especially convenient to prepare separately the mixture of organopolysiloxanes and of the titanic ester, and then to incorporate the mixture in the waxy composition, if desired after the latter has been melted. The mixture is then agitated until a uniform composition is obtained.

The protective compositions of this invention may be applied to supports of various kind by any convenient methods. They yield hard, waterproof coatings which may be frequently glossed without rubbing, or in any case with very light rubbing.

The following examples will serve to illustrate the invention but are not to be regarded as limiting it in any way. The parts are by weight and the compositions are prepared by mixing the ingredients by any orthodox method.

EXAMPLE I

Polishing wax for furniture

The following composition A:

| | Parts |
|---|---|
| Paraffin | 25 |
| Non-oxidised microcrystalline wax | 20 |
| White spirit | 155 |
| Oil of turpentine | 7 | gives a very hard, friable, homogeneous mass which is granular to the touch. When applied in a thin film to a waxed article of furniture, it is difficult to spread and necessitates vigorous rubbing after drying in order to produce a glossy surface. When aqueous liquids such as water, milk, wine and fruit juice, are deposited on this surface and allowed to dry, it is found that the stains which remain at the places on which these liquids have been deposited cannot be removed by simple wiping with a dry cloth.

When 3% of a methylpolysiloxane oil having a $CH_3$:Si ratio of 2:1 and a viscosity of 500 centistokes at 25° C. are added to the composition A during its preparation (when melting the waxes at 80°–90° C.), a hard, friable mass which is granular to the touch is obtained. If this mass is allowed to stand for 8 to 15 days, it is found that the polysiloxane oil rises to the surface and separates from the rest of the composition rendering the mixture unsuitable for marketing.

When, however, 2 parts of the same methylpolysiloxane oil and one part of butyl titanate are added to composition A during its preparation, a thick homogeneous paste is obtained which exhibits no separation during a storage period of 6 months. This mixture can readily be spread on a waxed surface by means of a cloth and when the film has dried, a gloss is very readily obtained by polishing with a dry cloth. Dried aqueous liquids, of the type described above, leave traces which show much less clearly than on composition A and these traces can be removed by simple wiping with a dry cloth, clearly showing the increased waterproofing properties of the films obtained.

EXAMPLE II

Polish

The following composition B:

| | Parts |
|---|---|
| Carnauba wax | 4 |
| Beeswax | 8 |
| Oil of turpentine | 30 | has a very hard consistency and uniform appearance, while having an irregular surface. When two parts of the methylpolysiloxane oil used in Example 1 are added, the consistency is still hard, but the mixture is very heterogeneous and the oil is exuded on the surface. When, in addition to the two parts of polysiloxane oil, one part of butyl titanate is added, a product which is almost liquid and of uniform consistency is obtained which does not exhibit any separation of oil on storage. Thin films obtained with the latter composition are very easy to polish but are soft.

When the following mixture:

| | Parts |
|---|---|
| Methylpolysiloxane oil as used in Example I | 1 |
| Methylpolysiloxane resin ($CH_3$:Si=1.5:1) in 70% solution in toluene | 1 |
| Triethanolamine titanate | 1.5 | is added to the composition B, in which 5 to 15 parts of oil of turpentine have been replaced by the same weight of secondary butyl alcohol, the consistency of the product obtained is thick, the appearance is uniform and the films obtained are glossy and hard.

EXAMPLE III

Automobile coach work polish

These products are normally employed after careful washing of the coachwork and may be applied by simple atomisation which can be readily effected by means of aerosols. An aerosol C having the following composition is prepared:

| | |
|---|---|
| Oxidised microcrystalline wax | 0.5 part |
| Trichloroethylene | 5 parts |
| Solvent having a boiling point between 95° and 115° C. | 15 parts |
| Atomising agent (for example butane) to make 100 parts. | |

It is found that the film obtained by the deposition of the spray on the lacquer of the vehicle has a dull reflection which disappears very readily if rubbed with a dry cloth.

When two parts of a methylpolysiloxane oil ($CH_3$:Si= 2:1) having a viscosity of 100 centistokes at 25° C. are added to composition C, in place of two parts of the atomising agent, the film obtained is much more waterproof than the previous film, but it must still be polished.

When, however, the following are added to composition C, again by replacement of the atomising agent on a weight-for-weight basis:

| | Parts |
|---|---|
| Methylpolysiloxane oil as used in Example I | 2 |
| Methylpolysiloxane resin as used in Example II | 1 |
| Butyl titanate | 1 | the film obtained by simple atomisation is glossier, more waterproof and harder, but it is found that the slow hydrolysis of the butyl titanate by atmospheric moisture causes white marks to appear.

When the butyl titanate is replaced by 1.5 parts of triethanolamine titanate and, 2 to 8 parts of the solvent having a boiling point between 95° and 115° C. of composition C are replaced by 2 to 8 parts of anhydrous ethanol, no white marks are observed and the film obtained has the same improved properties as the film obtained with the composition containing butyl titanate.

EXAMPLE IV

Waxing composition

The following composition D is prepared by the usual methods:

| | Parts |
|---|---|
| White microcrystalline wax | 3.7 |
| Unrefined microcrystalline wax | 1 |
| Colophony | 2 |
| Crude montan wax | 7 |
| Paraffin wax (M. P. 50–52° C.) | 8 | and is then saponified with a boiling solution of:

| | |
|---|---|
| Castile soap | 1 |
| Potassium carbonate | 1.3 |
| Water | 36 |

After saponification, it is dissolved in 40 parts of hot water.

A dark cream is thus obtained which may be tinted by water-soluble colouring agents, for example 0.5 to 1 part of Havana brown or 3 parts of nigrosine. Films obtained with this composition must be vigorously rubbed before becoming glossy. These films are not waterproof and lack hardness.

When 6 parts of a commercial emulsion containing 50% of methylpolysiloxane oil having a viscosity of 300 centistokes at 25° C. are added to the aforesaid composition D, so that the composition contains 3% of oil, the films obtained can be more readily polished, but they are only moderately waterproof, and in particular drops of water leave small white patches after drying.

When, however, 6 parts of an emulsion of the same methylpolysiloxane oil containing 30% of triethanolamine titanate as emulsifying agent, are added to composition D, films obtained with such a mixture can be just as readily polished as the previous film, but they are much more waterproof and drops of water dried thereon leave no traces.

It is also possible to include in the composition an antistatic material, e. g. an ionic wetting agent in association with a non-ionic wetting agent. Films of such compositions in addition to all the properties already mentioned, have the property of not attracting dust.

EXAMPLE V

Preservative cream for oil paintings

Composition D is used but the unrefined wax is replaced by white wax and the colophony is replaced by Japan wax. If the following mixture is added to this composition during preparation:

| | Parts |
|---|---|
| Methylpolysiloxane oil (as used in Example I) | 2 |
| Methylpolysiloxane resin ($CH_3:Si=1.5:1$) in 25% solution in toluene | 1 |
| Triethanolamine titanate | 1 |
| Ammonium oxalate | 1 | a product is obtained which, when employed for cleaning pictures and decorative paintings which have become yellowed due to successive depositions of dust and other soiling agents, causes disappearance of the dark haze produced by dust due to the water contained in the composition, disappearance of the surplus varnish generally deposited on such paintings due to the toluene contained in the polysiloxane resin solution and substantial brightening of the colours due to the presence of oxalate.

When the cleaning is finished, the film of the composition is allowed to dry and is rubbed with a dry rag to produce the gloss thus obtaining a protecting film replacing the previous varnish.

EXAMPLE VI

Automobile coach work solvent-type polish

The following composition E is prepared:

| | Parts |
|---|---|
| Carauba wax | 6 |
| White spirit | 70 |
| Oil of turpentine | 5 |

This composition, which is difficult to spread on the clean surface of the lacquer of the coachwork, must be vigorously rubbed to produce the final gloss. When to this composition E, three parts of the methylpolysiloxane oil used in Example III is added, the application is much easier and the gloss is obtained simply by passing a dry cloth over it, but the film obtained is only moderately waterproof.

Further, when two parts of methylpolysiloxane oil and one part of butyl titanate are added to composition E, the results are excellent, but after some time, depending upon the humidity of the air, a slight white haze appears due to the hydrolysis of the titanate.

When, however, to composition E, two parts of the same oil and 1.5 parts of triethanolamine titanate are added, and 10 to 20 parts of white spirit of the aforesaid composition E is replaced by 10 to 20 parts of dry or anhydrous butyl alcohol, the gloss and the waterproofing of the surface are remarkable and no white haze appears, regardless of the humidity of the air.

EXAMPLE VII

Polish for ski runners

The following composition F is prepared:

| | Parts |
|---|---|
| Carnauba wax | 20 |
| Colophony | 20 |
| Pine tar | 6 |

A hard solid is obtained which, when rubbed on the outer surface of the skis, reduces the coefficient of friction during the use of the skis and partially obviates sticking of the snow. When, to composition F, 1.3 parts of methylpolysiloxane oil ($CH_3:Si=2:1$) having a viscosity of 300 centistokes at 25° C. are added, a hard, heterogeneous solid is again obtained, but after 15 days to 3 weeks, it is found that the polysiloxane oil is completely exuded on the surface during storage and is absorbed by the porous packing used for the product.

When, however, 1.3 parts of the same polysiloxane oil and 1.3 parts of butyl titanate are added to composition F, a hard solid is again obtained, which is of very uniform composition and exhibits no exudation during storage, even after 6 months. The outer surface of skis coated with this latter composition has a lower coefficient of friction on the snow than with the composition F, and the presence of butyl titanate adds to the waterproofing action.

EXAMPLE VIII

Coating composition for typewriter ribbon and carbon paper

The following composition G is prepared:

| | Parts |
|---|---|
| Mixture of Methyl violet and Victoria blue | 1.75 |
| Oleic acid | 1.75 |
| Lamp black | 11.5 |
| Milori blue | 6 |
| Non-oxidised crystalline synthetic wax | 44 |
| Wool grease | 5 |
| Crude petroleum jelly | 5 |
| Mineral oil | 25 |

Carbon papers prepared from such a composition give the usual results. If the following are added to composition G during its preparation:

| | Parts |
|---|---|
| Methylpolysiloxane oil ($CH_3:Si=2:1$, viscosity 300 cst. at 25° C.) | 2 |
| Methylpolysiloxane resin ($CH_3Si=1.5:1$) in 70% solution in toluene | 2 |
| Butyl titanate or triethanolamine titanate | 3 | typewriter ribbons and carbon papers prepared from the latter composition give, under the pressure of the type of the typewriter, letters of much sharper appearance. The action is what might be expected if a film of polysiloxane were exuded on the surface of the wax film and the polysiloxane film acted as a barrier between the colouring composition, either of the ribbon or of the carbon paper, and the paper support, thus preventing the blurring of the type in the case of the ribbons, and general dirtying of the copies in the case of carbon papers. Finally, contrary to every expectation, the films of the modified colouring composition G are harder and the useful life of the typewriter ribbons and the carbon papers at least doubled.

We claim:

1. A coating composition comprising a substantially uniform admixture of a waxy composition, containing at least one wax selected from the class consisting of paraffin wax, carnauba wax, beeswax, montan wax, white wax, Japan wax and oxidised and non-oxidised crystalline and microcrystalline waxes, from 1 to 40% by weight of said waxy composition of at least one methyl polysiloxane selected from the class consisting of methyl polysiloxane oils and resins, and 0.5 to 20% by weight of said waxy composition of triethanolamine titanate.

2. A coating composition comprising a substantially uniform admixture of a waxy composition containing 0.5% to 100% of at least one wax selected from the class consisting of paraffin wax, carnauba wax, beeswax, montan wax, white wax, Japan wax and oxidised and non-oxidised crystalline and microcrystalline waxes, from 1 to 40% by weight of said waxy composition of at least one methyl polysiloxane selected from the class consisting of methyl polysiloxane oils and resins, and 0.5 to 20% by weight of said waxy composition of triethanolamine titanate.

3. A coating composition comprising a substantially uniform admixture of a waxy composition containing at least one wax selected from the class consisting of paraffin wax, carnauba wax, beeswax, montan wax, white wax, Japan wax and oxidised and non-oxidised crystalline and microcrystalline waxes, from 1 to 40% by weight of said waxy composition of a methyl polysiloxane oil having a $CH_3:Si$ ratio of 1.9:1 to 2.1:1 and 0.5 to 20% by weight of said waxy composition of triethanolamine titanate.

4. A coating composition comprising a substantially uniform admixture of a waxy composition containing at least one wax selected from the class consisting of paraffin wax, carnauba wax, beeswax, montan wax, white wax, Japan wax and oxidised and non-oxidised crystalline and microcrystalline waxes, from 1 to 40% by weight of said waxy composition of a methyl polysiloxane resin having a $CH_3:Si$ ratio of 1.3:1 to 1.7:1 and 0.5 to 20% by weight of said waxy composition of triethanolamine titanate.

5. A coating composition comprising a substantially uniform admixture of a waxy composition containing at least one wax selected from the class consisting of paraffin wax, carnauba wax, beeswax, montan wax, white wax, Japan wax and oxidised and non-oxidised crystalline and microcrystalline waxes, from 1 to 40% by weight of said waxy composition of a mixture of a methyl polysiloxane oil having a $CH_3:Si$ ratio of 1.9:1 to 2.1:1 and a methyl polysiloxane resin having a $CH_3:Si$ ratio of 1.3:1 to 1.7:1, and 0.5 to 20% by weight of said waxy composition of triethanolamine titanate.

References Cited in the file of this patent

UNITED STATES PATENTS

| | | |
|---|---|---|
| 2,410,737 | Jenny | Nov. 5, 1946 |
| 2,614,049 | Swanson | Oct. 14, 1952 |
| 2,626,870 | Cooke et al. | Jan. 27, 1953 |
| 2,628,170 | Green | Feb. 10, 1953 |
| 2,676,893 | Budner | Apr. 27, 1954 |